United States Patent [19]
Walker

[11] Patent Number: 5,253,193
[45] Date of Patent: Oct. 12, 1993

[54] COMPUTER METHOD AND APPARATUS FOR STORING A DATUM REPRESENTING A PHYSICAL UNIT

[75] Inventor: John Walker, Sausalito, Calif.

[73] Assignee: Autodesk, Inc., Sausalito, Calif.

[21] Appl. No.: 958,536

[22] Filed: Oct. 8, 1992

Related U.S. Application Data

[63] Continuation of Ser. No. 582,554, Sep. 14, 1990, abandoned.

[51] Int. Cl.$^5$ .................................................. G06F 7/38
[52] U.S. Cl. ............................................................ 364/748
[58] Field of Search ............................. 364/748, 746.2; 395/425

[56] References Cited

U.S. PATENT DOCUMENTS

| | | | |
|---|---|---|---|
| 3,845,465 | 10/1974 | Hosick et al. | 340/146.2 |
| 4,891,776 | 1/1990 | Kuroki et al. | 364/705.07 |
| 5,050,115 | 9/1991 | Matsuda et al. | 364/709.07 |
| 5,068,819 | 11/1991 | Misra et al. | 364/748 |

*Primary Examiner*—Tan V. Mai
*Attorney, Agent, or Firm*—Blakely, Sokoloff, Taylor & Zafman

[57] ABSTRACT

A method and apparatus of computation with physical units is described. The method and apparatus stores numbers in a computer system by storing a value and an exponent in a datum, the exponent representing the degree to which the value is represented by a physical unit. A method and apparatus for performing arithmetic on these numbers is further described. A method and apparatus for converting numbers between a computer system using one system of measurement to one using another system of measurement is also described.

17 Claims, 20 Drawing Sheets

COMPUTER METHOD AND APPARATUS FOR STORING A DATUM REPRESENTING A PHYSICAL UNIT

This a continuation of application Ser. No. 07/582,554, filed Sept. 14, 1990, now abandoned.

FIELD OF THE INVENTION

The present invention relates to the field of numerical representation in computers. More specifically, the present invention pertains to encoding the magnitude of a number along with the number's respective physical unit in a digital computer system.

BACKGROUND OF THE INVENTION

Certain prior computer systems represent numbers in a variety of ways depending on whether the numbers are integer values or floating point values. In said prior computer systems, these values are represented only as pure or dimensionless numbers. When said prior computers are used for calculating data for physical or engineering phenomena, the dimensions for the quantities involved or the units that they represent (length, mass, time, temperature, etc.) are neither stored by said computers nor checked for validity in arithmetic operations. This is true even though it would be an error, for example, to add a quantity representing time to one representing mass.

FIG. 1 shows how a value is represented in one prior computer system. The entire word 1 comprises merely a value 2 without any description of the units which it represents. In this prior scheme, the computer system performs operations on variables without any regard for the physical units which the variables may represent. Under this prior system of representation, a number representing time might erroneously be added to a number representing mass, for example. If this computation is not checked for type compatibility during programming by the computer programmer, then an error may result.

Nevertheless, in certain prior computer systems a compiler will yield an error if a character value is set to a numerical value, or vice-versa. No provision is currently made, however, in said prior computer system compilers to check whether given numerical values represent the same physical units. Therefore, the burden of keeping track of such physical units falls upon the programmer of said prior computers. The programmer, in turn, needs to use extensive manual bookkeeping, which is a procedure prone to error.

Moreover, in said prior computers, the conversion of a program designed for one set of units (for example, English units such as inches or pounds) to another set of units (such as metric meters or kilograms) might require reprogramming that potentially is complicated, tedious, and error-prone.

SUMMARY AND OBJECTS OF THE INVENTION

In view of the limitations of known systems and methods, one of the objectives of the present invention is to provide a method for storing values in a computer system together with their respective physical units so that operands may be checked for validity prior to calculations.

Another objective of the present invention is to provide a method for performing arithmetic operations using numerical values while keeping track of the respective physical units.

Another objective of the present invention is to provide a method to convert between units used in one measurement system in a computer to units used in another measurement system, and vice-versa.

These and other objectives of the present invention are provided for by a method and apparatus for storing a datum in a computer system which stores a first value that represents a signed magnitude of the datum. A second value is stored in a first dimension field, wherein the second value represents a signed magnitude of an exponent of a first physical unit.

These and other objectives of the present invention are further provided for by a method and apparatus for performing arithmetic operations such as adding and subtracting in a computer system. A first operand is stored comprising a first value that represents a signed magnitude of a first datum. The first operand further comprises a second value representing a signed magnitude of an exponent of a first physical unit of the first datum. A second operand is stored comprising a third value that represents a signed magnitude of a second datum. The second operand further comprises a fourth value representing a signed magnitude of an exponent of the first physical unit of the second datum. In the case of an addition or substraction the second and fourth values are checked to see if they are equal. If the second and fourth values are equal, then signed for an addition, the first and third values are added to form a sum, the sum is stored as a magnitude of a result datum and the second value is stored in a dimension field of the result datum. If the second and fourth values are equal, then for a subtraction, the third value is subtracted from the first value to form a difference, the difference is stored as a signed magnitude of a result datum, and the second value is stored in a dimension field of the result datum. For a multiplication, the first value is multiplied by the third value to form a product, and the product is stored as a signed magnitude of a result datum. The second and fourth values are then added to form a sum, and the sum is stored in a dimension field of the result datum. For a division, the first value is divided by the third value to form a quotient, and the quotient is stored as a signed magnitude of a result datum. The fourth value is then subtracted from the second value to form a difference, and the difference is stored in a dimension field of the result datum.

These and other objectives of the present invention are further provided for by a method and apparatus for converting in a computer system between a first measurement system and a second measurement system. This is accomplished by storing a datum comprising a first value representing a factor for the datum, a second value representing a bias for the datum, and a third value in a first dimension field that represents a signed magnitude of an exponent of a first physical unit for the datum in the first measurement system. For converting from a second measurement system to a first measurement system, a fourth value is stored in an operand that represents a signed magnitude of a first physical unit in the second measurement system. Then, the fourth value is multiplied by the first value to form a product. The second value is added to the product to form a sum, and the sum is stored as part of a result datum. The third value is then stored in a dimension field of the result datum. Alternatively, for converting from the first measurement system to the second measurement system, an operand is stored comprising a fourth value that represents a signed magnitude of a second datum, and a fifth value in a dimension field that represents a signed magnitude of an exponent of a first physical unit for the second datum in the first measurement system. If the third value and the fifth value are equal then the third value is subtracted from the fourth value to form a difference. Then, the difference is divided by the first value to form a quotient, and the quotient is stored in a result representing a signed magnitude of a physical unit in the second measurement system.

These and other objects of the invention are provided for by a method and apparatus for determining dimensional compatibility in a computer system by reading a first operand, the first operand comprising a first value that represents a signed magnitude of a first datum. The first operand also comprises a second value, wherein the second value represents a signed magnitude of an exponent of a first physical unit of the first datum. A second operand is read, the second operand comprising a third value that represents a signed magnitude of a second datum, and a fourth value, wherein the fourth value represents a signed magnitude of an exponent of a second physical unit of the second datum. Then, it is determined whether the first and second physical units are the same. If the first and second physical units are not the same then an error condition is indicated.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings in which like references indicate similar element and in which.

DETAILED DESCRIPTION

Figure 1:
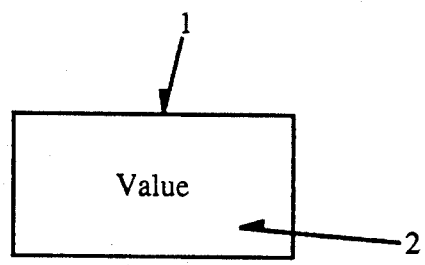
FIG. 1 shows a value as represented in one prior computer system.
Figure 2:
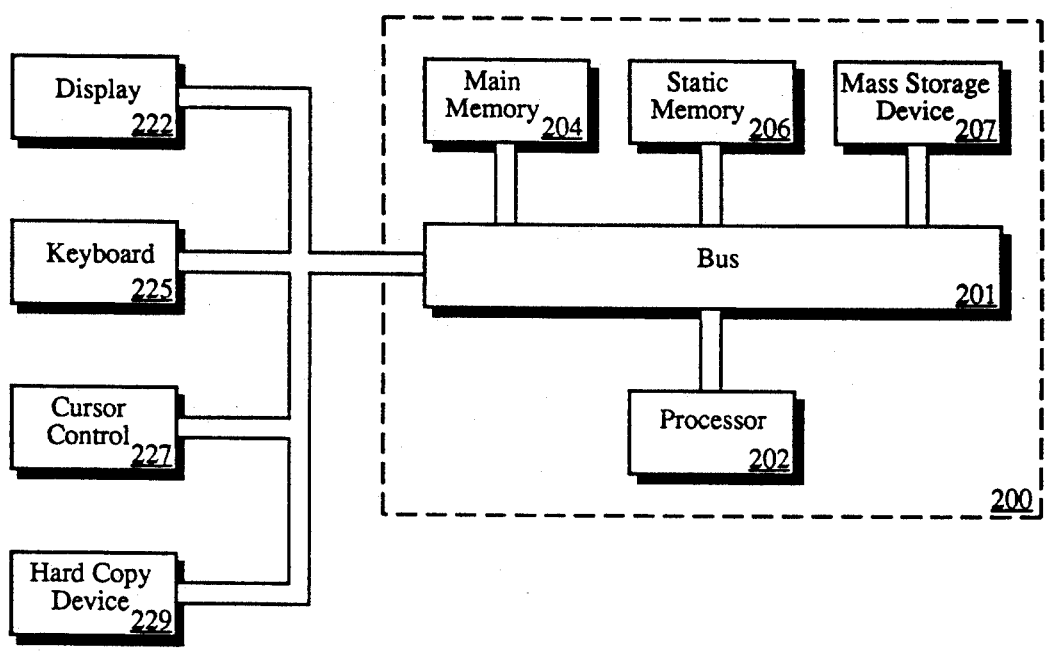
FIG. 2 shows a computer system which is used in the preferred embodiment.

The computer system of the preferred embodiment is described with reference to FIG. 2. The present invention may be implemented on a general purpose microcomputer, such as one of members of the IBM ® (a registered trademark of International Business Machines Incorporated of Armonk, N.Y.) Personal Computer, family, a member of the Apple Macintosh ® (a registered trademark of Apple Computer, Inc. of Cupertino, Calif. family, or one of several work-stations or graphics computer devices which are presently commercially available. Of course, the present invention may also be implemented on a multi-user system while encountering all of the cost, speed and function advantages and disadvantages available with these machines.

In any event, a computer system as may be utilized by the preferred embodiment generally includes a bus or other communication means 201 for communicating information, a processing means 202 coupled with said bus 201 for processing information, a random access memory (RAM) or other dynamic storage device 204 (commonly referred to as a main memory) coupled with said bus 201 for storing information and instructions for said processor 202, a read only memory (ROM) or other static storage device 206 coupled with said bus 201 for storing static information and instructions for said processor 202, a data storage device 207, such as a magnetic disk and disk drive, coupled with said bus 201 for storing information and instructions, a display device 222, such as a cathode ray tube, liquid crystal display, etc., coupled to said bus 201 for displaying information to the computer user, an alphanumeric input device 225 including alphanumeric and other keys coupled to said bus 201 for communicating information and command selections to said processor 202, and a cursor control device 227, such as a mouse, track ball, cursor control keys, etc., coupled to said bus 201 for communicating information and command selections to said processor 202 and for controlling cursor movement. Finally, it is useful if the system includes a hardcopy device 229, such as a printer, for providing permanent copies of information. The hardcopy device 229 is coupled with the processor 202, main memory 204, static memory 206 and mass storage device 207 through bus 201.

The processor 202 of the preferred embodiment is a 80386 microprocessor manufactured by Intel Corporation of Santa Clara, Calif. In the preferred embodiment, the system is operated using a standard IBM PC compatible DOS operating system.

Much of the software for implementing the preferred embodiment is written in the C language. Of course, other operating systems and programming languages could be selected in alternative embodiments; an object-oriented programming language, such as C, is desirable for a number features of such languages such as the use of class (or type) hierarchies.

It will be apparent, from an understanding of the present invention from the below description, that several of the above-mentioned components of the computer system of the preferred embodiment are not essential to operation of a computer system employing aspects of the present invention. For example, devices such as display 222, keyboard 225, cursor control 227 and hard copy device 229 may not be used in the preferred embodiment, but may be useful for a programmer who is employing the preferred embodiment in a computer system for programming, testing, and running applications.

Figure 3:
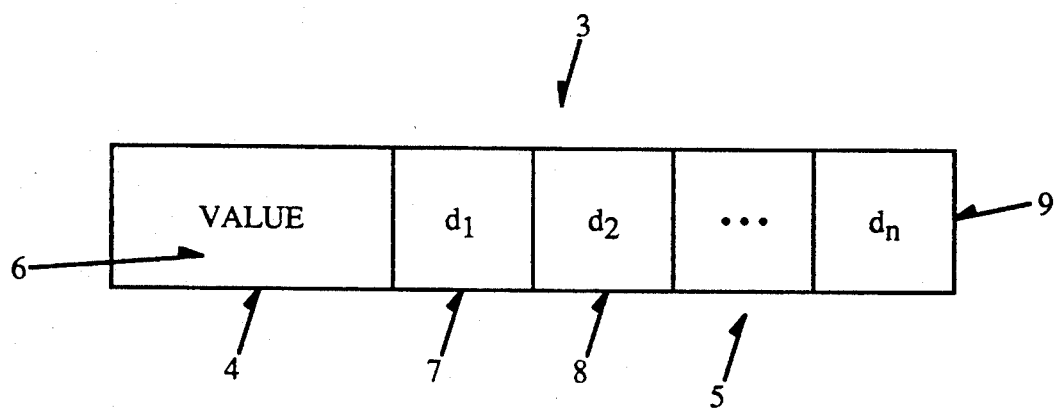
FIG. 3 shows a generalized storage scheme.

FIG. 3 shows an embodiment of the present invention in which a computer word 3 is divided into two halves 4 and 5. The first half 4 of word 3 is allocated for the value 6 of a variable, and the second half of the word 5 is reserved for representation of the dimensions for the physical units associated with that value. As shown in FIG. 3, the second half of word 5 is comprised of dimension fields $d_1$ 7, $d_2$ 8, ... $d_n$ 9. This generalized embodiment of the present invention has n dimensions, representing such units as time, length, mass, etc. Each of the dimensional exponent fields $d_1$ 7 through $d_n$ 9 contains an exponent that represents (1) whether the given value represents that unit or not and (2) the power of that unit. For instance, a dimension field $d_1$ containing an exponent of 0 represents that the value is not expressed in that unit at all. A value of 1 indicates that the number in the unit to the first power, 2 to the second power, and so one. The preferred embodiment of the representation scheme is discussed with reference to FIGS. 4 through 11.

Figure 4:
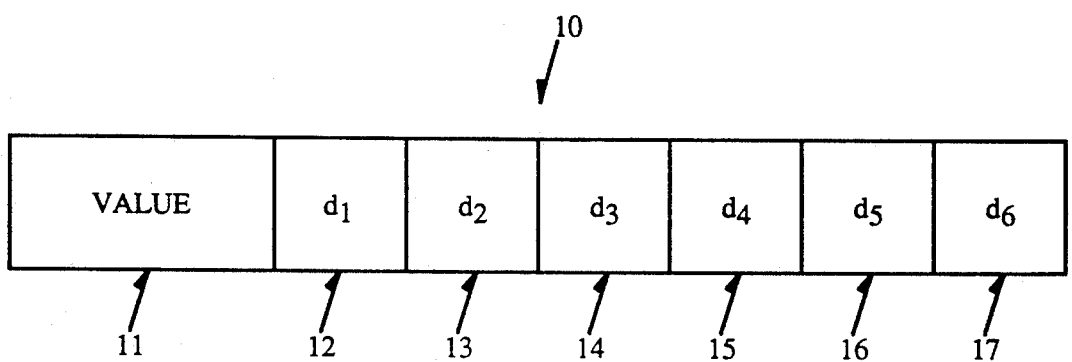
FIG. 4 shows a specific storage scheme.

In an embodiment shown in FIG. 4, an entire computer word 10 includes a value field 11 and six dimensional exponent fields $d_1$ 12 through $d_6$ 17. The international system of measurement (i.e., system international or "S.I.") is used and each of the dimensional exponent fields are defined as follows:

| Exponent | Quantity | Unit |
| --- | --- | --- |
| $d_1$ | Length | Meter |
| $d_2$ | Mass | Kilogram |
| $d_3$ | Time | Second |
| $d_4$ | Electric Current | Ampere |
| $d_5$ | Temperature | Kelvin |
| $d_6$ | Luminous Intensity | Candela |

In this preferred embodiment, the dimensions (units of measure) of given numbers are represented in the same datum as a given computer value. Because the information representing each of these unit values is contained within the same datum as the value, the computer system can check values before performing operations to ensure that they reflect valid units for the operation requested. Although in the preferred embodiment, as shown in throughout the remainder of this specification, the same datum that contains the value field is used to store these dimensional exponent fields, in an alternative embodiment the dimensional exponent fields may be stored in another area of computer memory, for instance, in a table containing exponent values, which corresponds with a table containing value fields.

Figure 5:
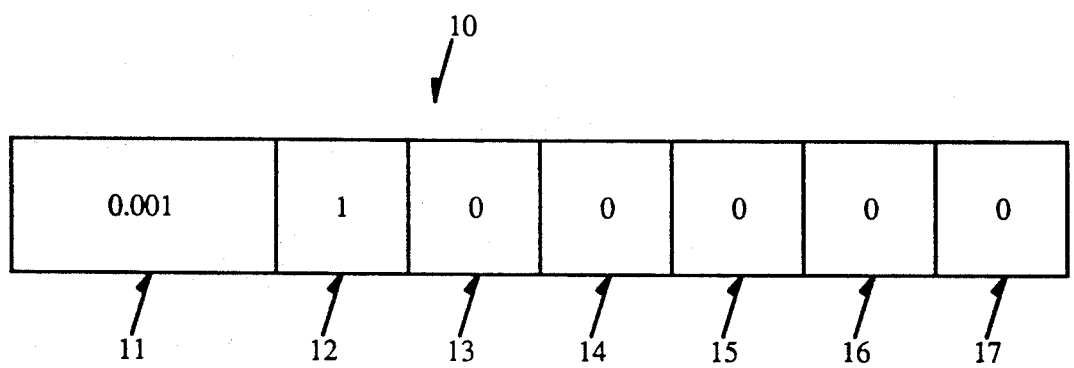
FIGS. 5 through 7 show examples of how unit values may be stored.

Referring to FIG. 5, a quantity which represents a length is shown. This length, 1 millimeter, would be stored as a 0.001 in value field 11, and a 1 would be stored in the dimensional exponent field $d_1$ 12. The remaining dimensional exponent fields, $d_2$ 13 through $d_6$ 17 would contain 0. Therefore, the value of this datum would be determined by the following product incorporating the value in value field 11 and the values in the exponent fields $d_1$ 12 through $d_6$ 17:

$$0.001 \times Meter^1 Kilogram^0 Second^0 Kelvin^0 Candela^0,$$

which is:

0.001 meters, or, in other words, 1 millimeter.

It can be appreciated that this representation scheme can be used to represent any value in the S.I. system.

Figure 6:
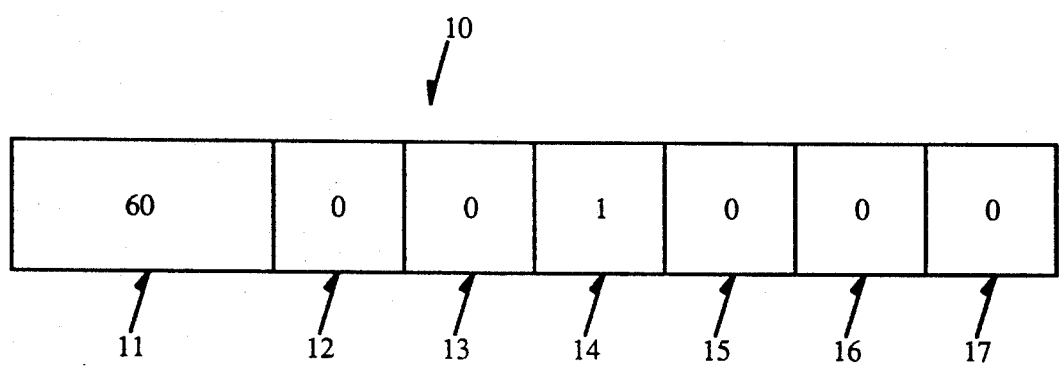

FIG. 6 shows another example. In order to represent a value of 1 minute, the value field 11 contains 60 and the time dimensional exponent field $D_3$ contains 1. Therefore, the value of this variable would be represented as:

$$60 \times Meter^0 Kilogram^0 Second^1 Ampere^0 Kelvin^0 Candela^0,$$

which is:

60 seconds (i.e., 1 minute).

If a computation involving, for example, the two values shown in FIGS. 5 and 6 is attempted, the computer system 200 can determine whether the given operation is valid depending on the values contained in the dimensional exponent fields $d_1$ 12 through $d_6$ 17. An addition of the value shown in FIG. 5 to the value shown in FIG. 6, for example, would not be permissible because their dimensional exponents are different (representing length and time respectively). Because the representation of the number 10 shown in FIGS. 5 and 6 contains unit dimensional exponents 12-17, they can be checked for valid or permissible units prior to any computation.

Figure 7:
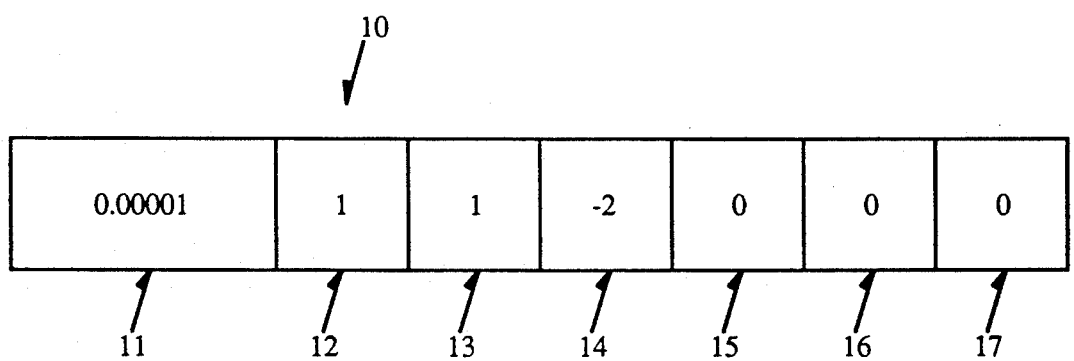

FIG. 7 shows another example. A value representing a unit of force—namely, dynes—is shown. In FIG. 7, value field 11 contains 0.00001, the length field $d_1$ 12 contains 1, the mass field $d_2$ 13 contains 1, and time field $d_3$ 14 contains $-2$. The value which is generated from this figure, is represented as:

$$0.00001 \times Meter^1 Kilogram^1 Second^{-2} Ampere^0 Kelvin^0 Candela^0,$$

which shortens to:

0.00001 kilogram meters/second$^2$.

As long as the underlying system of units is complete, any physical unit can be represented. For example, length, mass, time, electric current, temperature, or luminous intensity components can be represented, and combined to represent measures of area, volume, force, acceleration, electrical charge, etc.

It can be appreciated that computer data could be stored in one or more computer registers during computation, or one or more computer memory locations.

Numbers set forth in this detailed description are in base 10 form (decimal), but it is to be appreciated that said numbers would be ordinarily stored in a digital computer in base 2 (binary) in the preferred embodiment.

Figure 8:
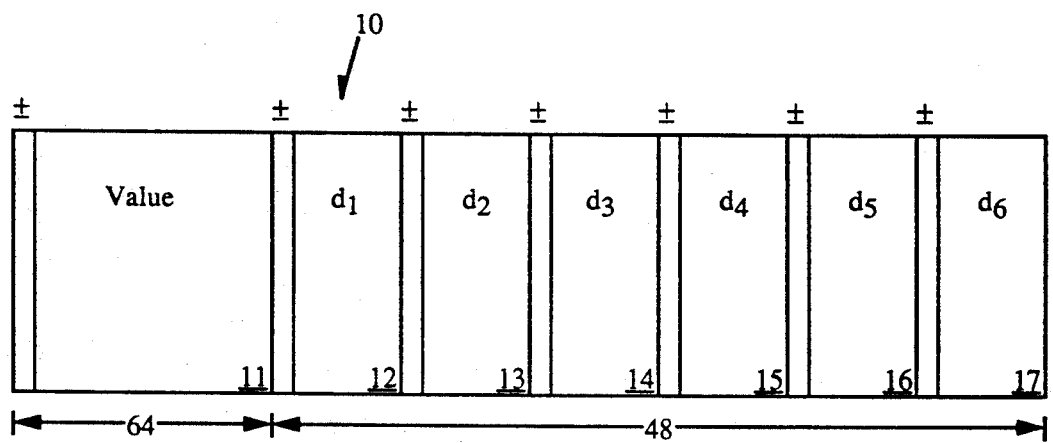
FIG. 8 shows the allocation of a computer word.

This method may be implemented in discrete hardware components, very large-scale integrated circuits, firmware, software or any combination thereof. The preferred embodiment is used in release 11 of Auto-CAD ® produced by Aoutodesk ®, Inc. of Sausalito, Calif. for use on an IBM microcomputer (both Autodesk ® and AutoCAD ® are registered trademarks of Autodesk ®, Inc. of Sausalito, Calif. An allocation of a computer word of the preferred embodiment is shown in FIG. 8. Notice that computer word 10 is comprised of 112 bits. The total computer word is divided into a value field 11 and dimensional exponent fields $d_1$ 12 through $d_6$ 17. The value field 11 is comprised of 64 bits.

Each of the dimensional exponent fields comprise the rest of the word.

Figure 9:
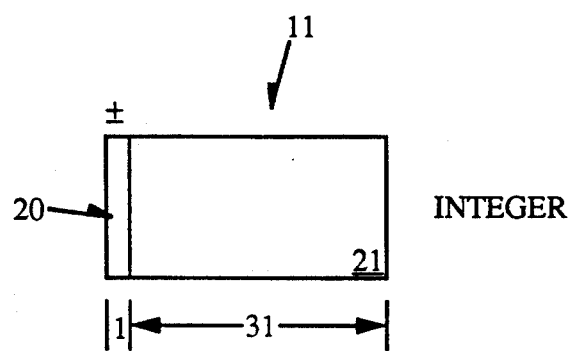
FIG. 9 shows a value field in detail for an integer.
Figure 10:
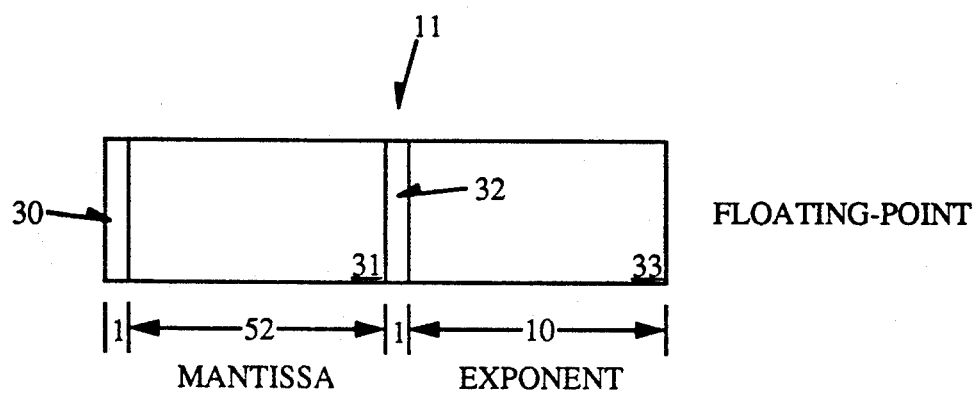
FIG. 10 shows the value field in detail for a floating-point number.

The value field 11, as shown in FIGS. 9 and 10, may be either an integer or a floating-point value. As shown in FIG. 9, if the value is an integer, the leading or most significant bit of value field 11 is comprised of a sign bit 20. If the bit is 0, then it indicates that the integer value 21 is a positive number. If sign bit 20 is 1 then the integer value 21 is a negative number. Integer 21 is comprised of a value which is comprised of 31 bits. If integer bit 20 is a 1, indicating a negative value, the remainder of the integer value 21 is comprised of a two's complement value.

With reference to FIG. 10, the value field 11 may alternatively comprise a floating-point number. If value 11 is a floating-point number, then it is comprised of two components with 52 bits for a mantissa 31 and 10 bits for an exponent 33. Mantissa 31 and exponent 33 each have sign bits 30 and 32, respectively, associated with them. The mantissa 31 is a number that has a leading decimal point with the corresponding value to the right of the decimal point. Exponent 33 of value 11 is represented as a power of 10. Therefore, if mantissa 31 contains 0.1, a corresponding exponent 33 containing 2 would yield $0.1 \times 10^2$, or $0.1 \times 100$, which equals 10.

Figure 11:
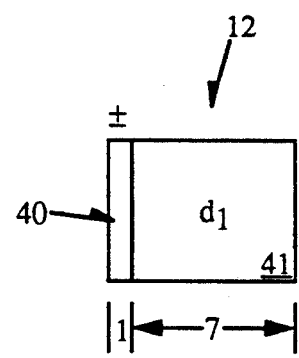
FIG. 11 shows the dimensional exponent field in detail.

A detailed illustration of the dimensional exponent field $d_1$ 12 is shown in FIG. 11. Dimensional exponent field $d_1$ 12 is comprised of 8 bits. As shown in FIG. 6, the entire word 11 is comprised of 6 dimensional exponents $d_1$ 12 through $d_6$ 17, which represent each of the unit values in the S.I. system, meter, kilogram, second, Ampere, degrees Kelvin, and candela respectively. The leading or most significant bit of the dimensional exponent field $d_1$ 12 is a sign bit 40, wherein 0 represents a positive exponent value, and 1 represents a negative exponent value. The remainder of the dimensional exponent field $d_1$ 12 is a value representing the exponent for the particular physical unit associated with field $d_1$ 12. The exponent's value $d_1$ 12 is represented in two's complement if it has a sign bit 40 indicating that it is a negative number. Each of the other dimensional exponent fields $d_1$ 13 through $d_6$ 17 similarly include (1) a sign bit and (2) an exponent value.

Figure 12:
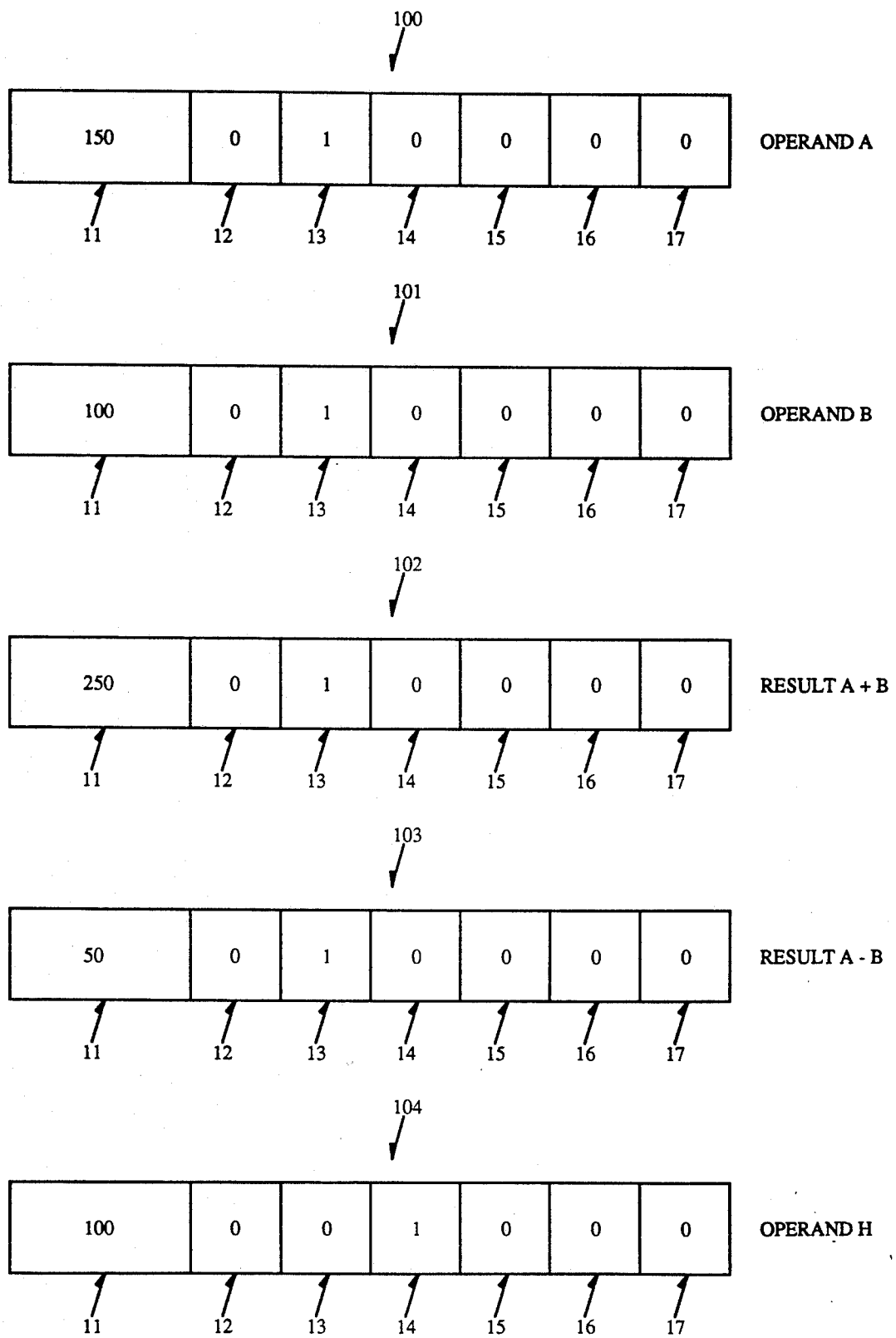
FIG. 12 shows examples of operands upon which addition and subtraction may be performed and the results of those operations.
Figure 13:
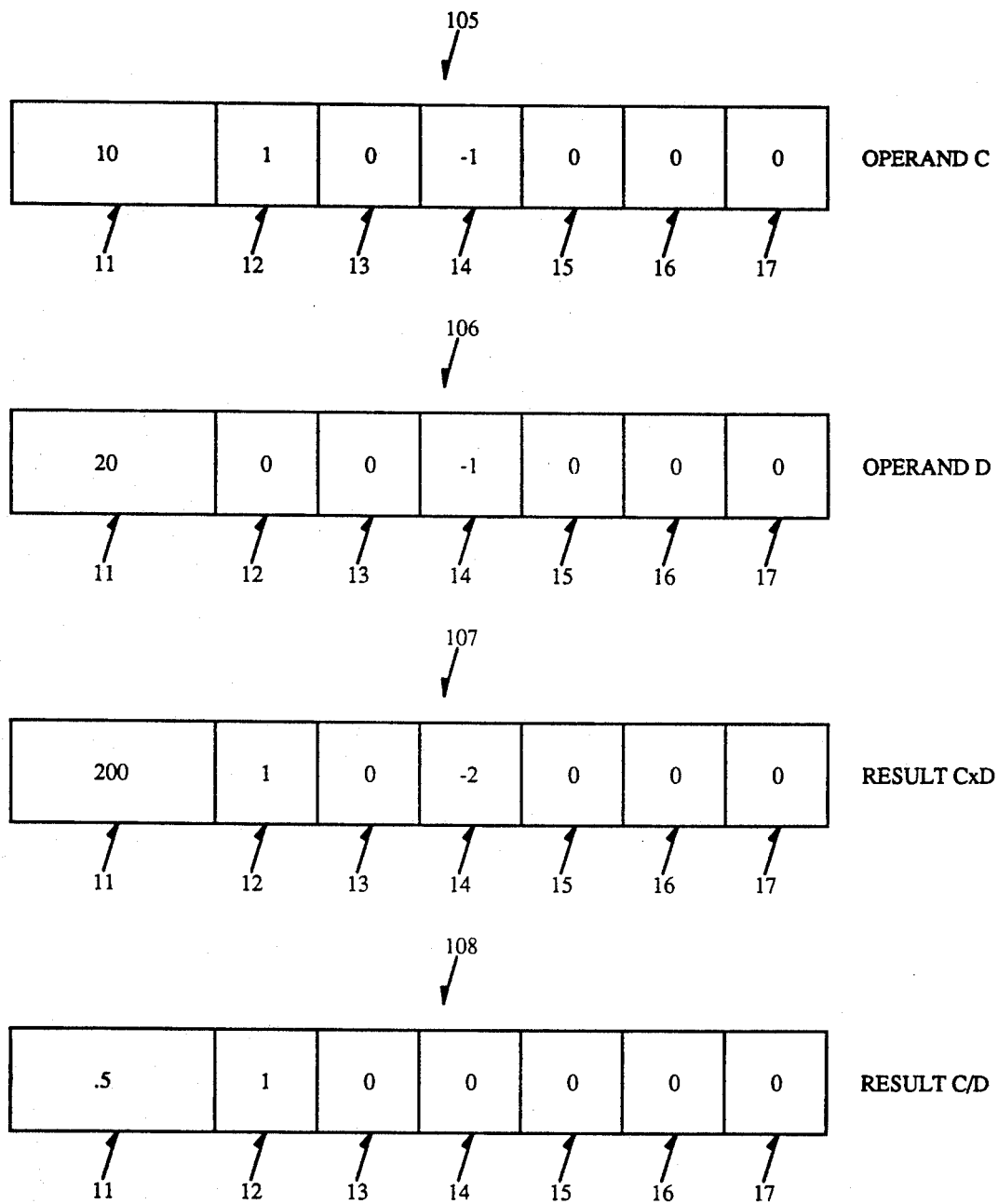
FIG. 13 shows examples of operands upon which multiplication and division may be performed and the results of those operations.

FIGS. 12 and 13 relate to arithmetic operations in the preferred embodiment. Fundamental arithmetic operations can be performed using the above described representation technique of physical units.

A description of addition and subtraction operations is shown in FIG. 12. If an addition or subtraction is performed, then all of the dimensional exponents of the two operands must be equal. If an operation is attempted on two values, but they represent different measures (for instance, time and length), then an error condition results and the computation should not be performed. However, if dimensional exponent fields are equal, two values may be added or subtracted as required, and the dimensional exponent fields are passed on unchanged to be associated with the resulting value.

As shown in FIG. 12, operands A 100 and B 101 are shown as including the same dimensional exponents. Operand A 100 contains 150 in value field 11, and operand B 101 contains 100 in its value field 11. Both of their dimensional exponents are equal, in other words, a 1 is contained in the dimensional exponent field $d_2$ 13 for both operands A and B. The remainder of the dimensional exponent fields $d_1$ 12 and $d_3$ 14 through $d_6$ 17 contain a 0. Therefore, operands A 100 and B 101, may be added together or subtracted from each other because their dimensional exponent fields are equal. The dimensional exponents $d_1$ 12 through $d_6$ 17 are therefore passed on unchanged in the result. Result 102 is the sum of operands A 100 and B 101. Notice that value field 11 of result 102 is now equal to 250, which is the sum of the value fields 11 of operands A 100 and B 101. Notice also that the dimensional exponents $d_1$ 12 through $d_6$ 17 have been passed on unchanged.

A subtraction is performed in a similar manner. The result of the subtraction of A 100 and B 101 is shown in FIG. 12 as result 103. Value field 11 of result 103 is equal to 50 which is 150 minus 100. The dimensional exponents for result 103 are the same as those for operands A 100 and B 101. Notice that operand H 104, cannot be added to or subtracted from A 100 or B 101 because it contains a 1 in time exponent $d_3$ 14, whereas A 100 and B 101 do not.

A multiplication, on the other hand, will multiply the value fields of the operands for the resulting value, and store the sums of the dimensional exponent fields in the resulting dimensional exponents. For instance, with reference to FIG. 13, two operands C 105 and D 106 may be multiplied.

Operand C 105 has a 10 in value field 11, with a 1 in length exponent field $d_1$ 12 and a $-1$ in time exponent field $d_3$ 14. Zeros are in the other dimensional exponent fields. Operand C is thus:

$$10 \times Meter^1 Kilogram^0 Second^{-1} Ampere^0 Kelvin^0 Candela^0$$

or a velocity of 10 meters/second.

Operand D 106 has a 20 in value field 11, with a $-1$ in time field $d_3$ 14. Zeros are contained in the other dimensional exponent fields. Operand D is thus:

$$20 \times Meter^0 Kilogram^0 Second^{-1} Ampere^0 Kelvin^0 Candela^0.$$

The result of $C \times D$ 107 is shown in FIG. 12. Result 107 has a value 11 containing 200, the product of 10 and 20 from the value fields of operands C 105 and D 106. Because the dimensional exponent fields are totalled, $d_1$ 12 is 1, and time exponent field $d_3$ 14 of result 107 is set to $-2$. Thus result 107 is equal to:

$$200 \times Meter^1 Kilogram^0 Second^{-2} Ampere^0 Kelvin^0 Candela^0,$$

which is an acceleration of 200 meters/second$^2$.

A divison operation is basically the converse of the multiplication operation and is discussed with reference to FIG. 13. When operand C 105 is divided by operand D 106, value field 11 of C 105 is divided by the value field of D 106. In addition, dimensional exponent fields $d_1$ 12 through $d_6$ 17 of D 106 are subtracted from those of operand C 105. Therefore, with reference to FIG. 13, if C 105 is divided by D 106, the value field 11 of result C/D 108 is 10/20 or 0.5. The length exponent field $d_1$ 12 is subtracted, yielding a 1 in $d_1$ 12 of 108, and the time exponent field $d_3$ 14 is likewise subtracted, yielding 0. The remaining dimensional exponent fields $d_2$ 12 through $d_6$ 17 of 108 are also subtracted. The result 108 is:

$$0.5 \times Meter^1 Kilogram^0 Second^0 Ampere^0 Kelvin^0 Candela^0,$$

which is 0.5 meters.

In this preferred embodiment, dimensional conversion can be performed if a factor and a bias value are represented in the value field of a number called a unit definition datum. An external variable can then be set to the arbitrary unit used in the internal measurement system as defined in the unit definition datum for the units represented in the external measurement system. This unit definition datum defines the relationship between an arbitrary unit represented externally and an arbitrary unit represented internally to allow conversion between the two.

FIGS. 14 through 20 relate to a method for dimensional conversion between variables represented in units of measure external to the system to variables represented in units of measure internal to the system. This conversion is accomplished by using a unit definition datum which is described with reference to FIG. 14. In unit definition datum 50, value field 11 is replaced by factor field 51 and bias field 52. Unit definition datum 50 retains the dimensional exponents $d_1$ 53 through $d_6$ 58, representing length, weight, time, electric current, temperature, and luminous intensity. This would be meter, kilogram, second, Ampere, degrees Kelvin, and candela, respectively, in the S.I. system.

In the preferred embodiment, dimensional conversion is accomplished by multiplying an external value by factor 51 of unit definition datum 50 and then adding bias 52. In other words, Internal Value = External Value × Factor + Bias.

Figure 14:
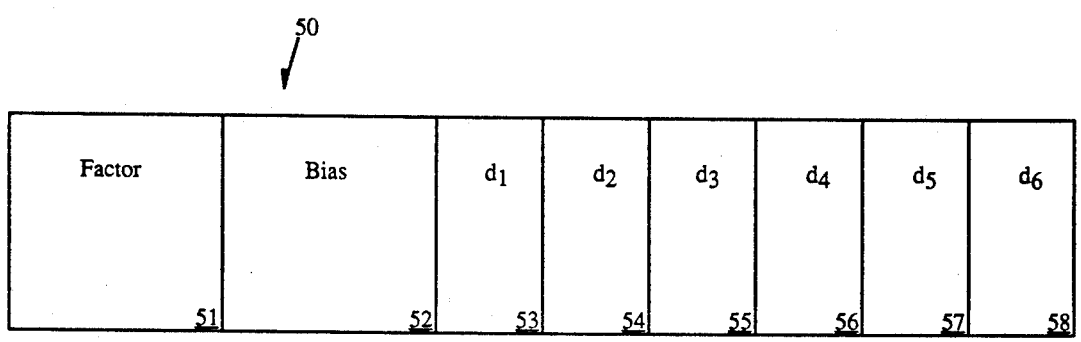
FIG. 14 shows a unit definition datum.
Figure 15:
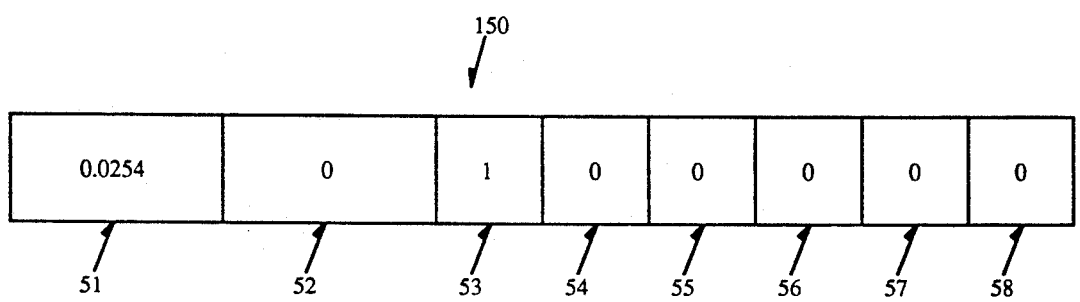
FIGS. 15 and 16 show examples of specific unit definition data.

In FIG. 15, an "inch" unit is defined with the unit definition datum 150. In other words, an inch=0.0254 meters with 0.0254 in value field 51, a 0 in bias field 52, a 1 in length exponent field $d_1$ 53, and zeros in all of the remaining dimensional exponent $d_2$ 13 through $d_6$ 17. Since 0 inches=0 meters, bias field 52 of unit definition datum 150 as shown in FIG. 14 is 0. Bias field 52 allows definition of the zero point of the external measurement system with reference to the internal measurement system.

Figure 16:
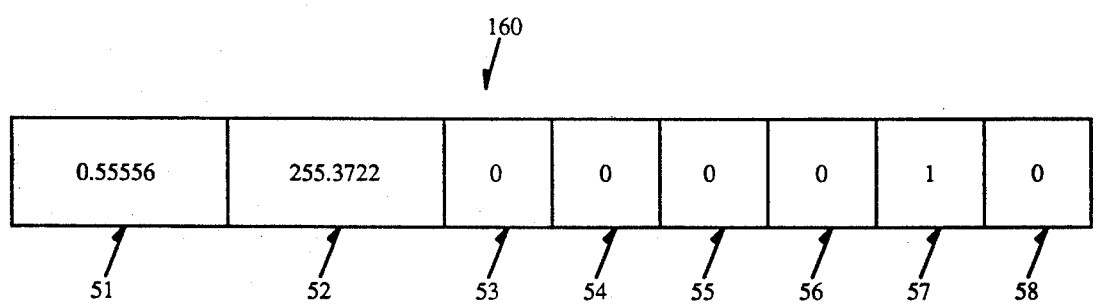

In FIG. 16, a unit definition datum 160 describing degrees Fahrenheit is shown. All of the dimensional exponent fields $d_1$ through $d_6$ 53-58 are zero except for temperature exponent field $d_5$ 57, which contains a 1. The factor field as shown in FIG. 15 is 0.55556 since 1° Fahrenheit=0.55556° Kelvin. However, the zero points between Fahrenheit and Kelvin are also different. Therefore, bias field 52 is 255.3722 since 0° Fahrenheit=255.3722° Kelvin. So to convert from an external value of 32° Fahrenheit, to an internal value represented in the S.I. system, the computation should be accomplished as follows:

Internal Value = External Value × 0.5556 + 255.3722

Internal Value = 32 × 0.5556 + 255.3722, and thus

Internal Value = 273.15.

Figure 17:
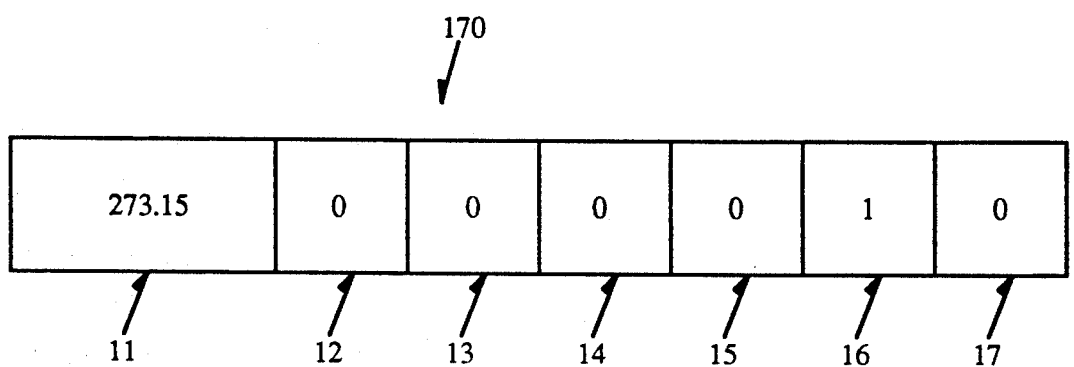
FIGS. 17 and 18 show examples of numbers that have been converted using a unit definition datum.

The temperature in degrees Kelvin would therefore be stored as shown in FIG. 17, result 170 as 273.15 in value field 11 with corresponding 1 in temperature field $d_5$ 16. The remaining dimensional exponent fields $d_1$ 12 through $d_4$ 15, and $d_6$ 17 contain zero.

Conversely, for converting from internal units to external units, the following computation must be performed:

External Value = (Internal Value − Bias)/Factor.

Figure 18:
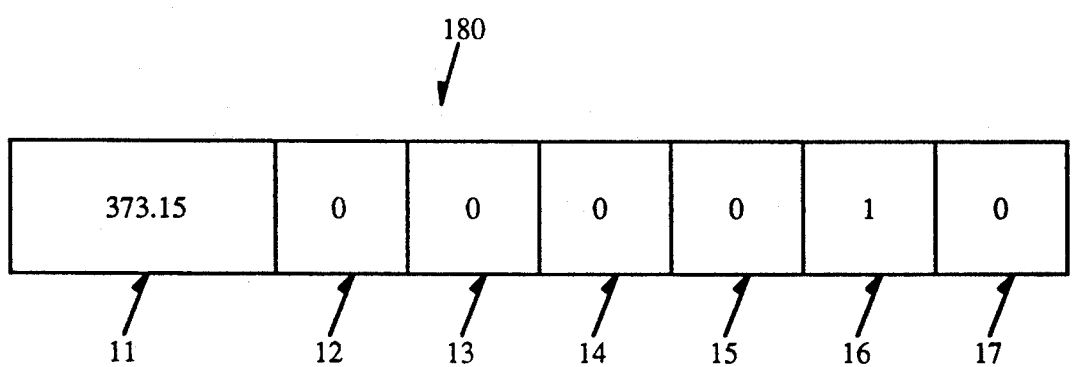

As shown in FIG. 18, operand 180, the boiling point of water in degrees Kelvin, is 373.15. Therefore, the value field 11 is 373.15 and temperature dimension $d_5$ 16 contains 1. The conversion to the Fahrenheit unit definition would be:

External Value = (Internal Value − 255.3722)/0.55556

External Value = (373.15 − 255.3722)/0.55556, and thus

External Value = 212.

In the preferred embodiment, as discussed above, the external variable which is represented in degrees Fahrenheit would then be set to a value of 212.

Figure 19:
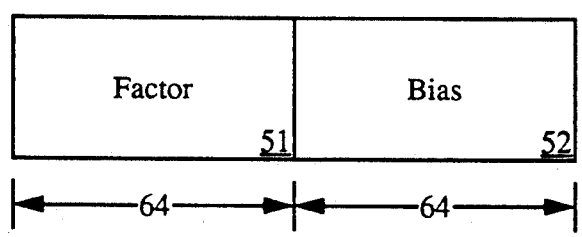
FIG. 19 shows the allocation of the computer word for the factor and bias fields of the unit definition datum.
Figure 20:
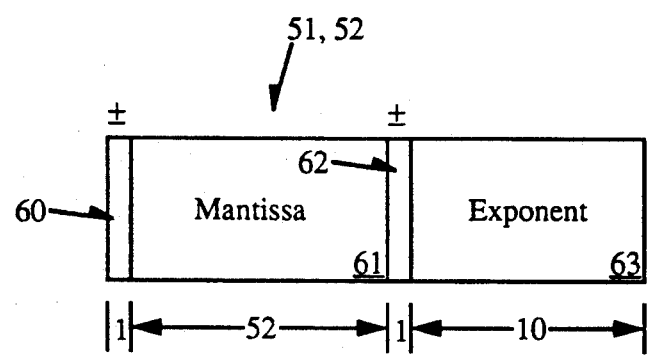
FIG. 20 shows bit allocations for the factor and bias fields in detail.

FIGS. 19 and 20 show the factor and bias fields in detail. As shown in FIG. 19, factor field 51 and bias field 52 each comprise 64 bits. The factor 51 and bias 52 fields, as shown in FIG. 20, are represented as floating-point numbers, with a mantissa 61 comprising 52 bits of data. The exponent 63 comprises 10 bits. Mantissa 61 and exponent 63 also have sign bits 60 and 62, respectively associated with them, which are positive when those bits are set to 0, and 1 when they are negative.

The units used in the dimensional exponent fields, as discussed previously, may be English units represented by feet, pounds, etc. In addition, schemes may be implemented on various computer systems, in which the specific word lengths and representations of value fields may be changed, depending on the particular hardware implementation in which the scheme is used.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer controlled method for storing a datum in a computer system to associate a value with a physical unit, comprising the steps of:

said computer system storing a first signed value in a single magnitude register that represents a signed magnitude of said datum represented in said physical unit;

said computer system storing a plurality of second values in a plurality of dimension fields of a single dimension register associated with said magnitude register, wherein said plurality of second values represent signed magnitudes of exponents of a plurality of base physical units for different base units of measure in the international (SI) system of measurement, wherein said plurality of dimension fields each comprise eight bits of information, including a single sign bit, wherein at least two of said second plurality of values are non-zero values representing said physical unit, said physical unit being a combination of at least two of said base units of measure in said SI system of measurement, each of said at least two base units of measure having a magnitude according to respective values stored in each of said at least two of said plurality of dimension fields.

2. The method of claim 1 wherein said plurality of physical units represent length, mass, time, electric current, temperature and luminous intensity.

3. The method of claim 2, wherein length is represented in meters, mass is represented in kilograms, time is represented in seconds, electric current is represented in Amperes, temperature is represented in degrees Kelvin, and luminous intensity is represented in candelas.

4. The method of claim 1, wherein said first value is represented as an integer.

5. The method of claim 1, wherein said first value is represented as a floating-point value.

6. The method of claim 1, wherein said datum is a binary number.

7. The method of claim 1, wherein said first value is comprised of 64 bits.

8. A computer controlled apparatus for storing a datum in a computer system to associate a value with a physical unit, comprising the steps of:
   means for storing a first signed value in a single magnitude register that represents a signed magnitude of said datum represented in said physical unit;
   means for storing a plurality of second values in a plurality of dimension fields of a single dimension register associated with said magnitude register, wherein said plurality of second values represent signed magnitudes of exponents of a plurality of base physical units for different base units of measure in the international (SI) system of measurement, wherein said plurality of dimension fields each comprise eight bits of information, including a single sign bit, wherein at least two of said second plurality of values are non-zero values representing said physical unit, said physical unit being a combination of at least two of said base units of measure in said SI system of measurement, each of said at least two base units of measure having a magnitude according to respective values stored in each of said at least two of said plurality of dimension fields.

9. The apparatus of claim 8 wherein said plurality of physical units represent length, mass, time, electric current, temperature and luminous intensity.

10. The apparatus of claim 9, wherein length is represented in meters, mass is represented in kilograms, time is represented in seconds, electric current is represented in Amperes, temperature is represented in degrees Kelvin, and luminous intensity is represented in candelas.

11. The apparatus of claim 8, wherein said first value is represented as an integer.

12. The apparatus of claim 8, wherein said first value is represented as a floating-point value.

13. The apparatus of claim 8, wherein said datum is a binary number.

14. The apparatus of claim 8, wherein said first value is comprised of 64 bits.

15. The apparatus of claim 8 wherein said means for storing said first value and second plurality of values comprises a processor coupled to a memory.

16. A computer controlled method for storing a datum in a computer system to associate a value with a physical unit, comprising the steps of:
   said computer system storing a first signed value in a single magnitude register that represents a signed magnitude of said datum represented in said physical unit;
   said computer system storing a plurality of second values in a plurality of dimension fields of a single dimension register associated with said magnitude register, wherein said plurality of second values represent signed magnitudes of exponents of a plurality of base physical units for different base units of measure in the international (SI) system of measurement representing length, mass, time, electric current, temperature and luminous intensity, wherein length is represented in meters, mass is represented in kilograms, time is represented in seconds, electric current is represented in Amperes, temperature is represented in degrees Kelvin, and luminous intensity is represented in candelas, wherein said plurality of dimension fields each comprise eight bits of information, including a single sign bit, wherein at least two of said second plurality of values are non-zero values representing said physical unit, said physical unit being a combination of at least two of said base units of measure in said SI system of measurement, each of said at least two base units of measure having a magnitude according to respective values stored in each of said at least two of said plurality of dimension fields.

17. A computer controlled method for storing a datum in a computer system to associate a value with a physical unit, comprising the steps of:
   said computer system storing a first signed value in a magnitude field of a register that represents a signed magnitude of said datum represented in said physical unit;
   said computer system storing a plurality of second values in a plurality of dimension fields of said register associated with said magnitude field, wherein said plurality of second values represent signed magnitudes of exponents of a plurality of base physical units for different base units of measure in the international (SI) system of measurement representing length, mass, time, electric current, temperature and luminous intensity, wherein length is represented in meters, mass is represented in kilograms, time is represented in seconds, electric current is represented in Amperes, temperature is represented in degrees Kelvin, and luminous intensity is represented in candelas, wherein said plurality of dimension fields each comprise eight bits of information, including a single sign bit, wherein at least two of said second plurality of values are non-zero values representing said physical unit, said physical unit being a combination of at least two of said base units of measure in said SI system of measurement, each of said at least two base units of measure having a magnitude according to respective values stored in each of said at least two of said plurality of dimension fields.

* * * * *